United States Patent Office 2,856,399
Patented Oct. 14, 1958

2,856,399

METHOD OF PREPARING DICARBOXYLIC ACID ESTERS OF THE LOWER FATTY ACID ESTERS AND THE ETHERS OF CELLULOSE CONTAINING FREE AND ESTERIFIABLE HYDROXYL GROUPS

John W. Mench, Brazelton Fulkerson, and George B. Lapham, Rochester, N. Y., assignors to Eastman Kodak Company, Rochester, N. Y., a corporation of New Jersey No Drawing. Application February 11, 1957
Serial No. 639,233

7 Claims. (Cl. 260—224)

This application relates to a method of preparing dicarboxylic acid esters of cellulose in which the major portion of the dicarboxylation is conducted in a relatively short period at a high reaction temperature followed by its completion at a lower reaction temperature.

The preparation of dicarboxylic acid esters of cellulose was described in U. S. Patent No. 2,093,462 of Malm and Waring. That process involved the reaction of partially substituted cellulose esters or cellulose ethers with phthalic anhydride in the presence of pyridine or a similar base, the latter acting both as the catalyst and the reaction solvent. The reactions there were usually carried out at temperatures of 60–65° C. and often the reactions required two or more weeks to obtain the desired product. Even the shorter of the procedures described there required times on the order of 1 or 2 days for preparing the desired product.

More recently a method has been described for preparing dicarboxylic acid esters of cellulose in U. S. Patent No. 2,759,925 of Hiatt, Mench and Emerson. That method involves the reaction of a partially substituted cellulose ester or cellulose ether with a dicarboxylic acid anhydride in a bath in which acetic acid is employed as the solvent and a basic material such as sodium acetate is employed as the catalyst. In that process the esterifications are ordinarily carried out at 80° C. or higher resulting in considerable shortening of the esterification time. In the making of phthalic acid esters of cellulose, it is desirable to run the esterification so that the maximum percentage of phthalyl content is imparted with the reagents employed.

One object of our invention is to provide a procedure for making dicarboxylic acid esters of cellulose in which the maximum content of dicarboxylic acid radical is obtained in the product. Another object of our invention is to provide a process of preparing dicarboxylic acid esters of cellulose using minimum reaction times. Other objects of our invention will appear herein.

We have found that under a given set of conditions the highest phthalyl content of a cellulose ester results if the phthalation reaction is carried out for a substantial time at low reaction temperatures. Preferably the process is carried out in two steps, the first step involves the use of high reaction temperature for a short time, and the second step comprises cooling the mass and introducing the remainder of the phthalyl to the cellulose ester at a low reaction temperature. We have found that by this means dicarboxylic acid esters of cellulose having the highest dicarboxylic acid radical contents are obtained without the necessity of a considerably longer reaction time.

In its broadest aspects our invention comprises the preparation of a dicarboxylic acid ester of cellulose by reacting first at high temperature upon a partially substituted cellulose ester or cellulose ether with a dicarboxylic acid anhydride either by the pyridine method or by the method which employs sodium acetate catalyst and acetic acid solvent. After a short time the temperature is reduced such as to 50–60° C. or lower and the esterification is completed at such lowered temperature.

The first part of the reaction is carried out at a temperature from 80° C. up to the reflux temperature of the esterification bath employed. One to six hours reaction time at this elevated temperature is sufficient for the introduction of the major portion of the dicarboxylic acid radical which can be introduced into the cellulosic material. Usually after only one hour substantially all of the dicarboxylic acid radical which will be introduced into the cellulose material at that temperature has combined therewith. Therefore in the preferred embodiment of the invention the temperature is reduced after 1–2 hours' reaction at the higher reaction temperature. We have found that when the temperature of the reaction mass is lowered and maintained after the initial reaction, additional dicarboxylic acid radical combines with the cellulose. In those processes having limited liquid to solid ratios, reduced temperatures in the vicinity of 50° C. to 60° C. are considered the most useful. If larger proportions of solvent are present still lower temperatures may be used without seriously increasing the viscosity of the mass and hence are useful for the second phthalylation step.

Our esterification procedure is an improvement both over esterification methods which are carried out at lower esterification temperatures such as 60° C., 25° C. or the like in that the phthalations using those temperatures are time-consuming and over those esterifications which are carried out at high temperatures such as 80° C. to 100° C. and the like in which the amount of phthalyl introduced is short of that which it is possible to introduce.

To illustrate our invention a series of runs were made in which the initial phthalation temperature was 100° C. and the time was two hours followed by cooling to various temperatures and sampling at various time intervals. In these runs one part of cellulose acetate having an acetyl content of 32.2 percent was dissolved in two parts of acetic acid, 0.5 part of sodium acetate and 1.2 parts of phthalic anhydride and was kept at 100° C. for two hours. The various masses were then respectively cooled to the temperatures pointed out in the following table and samples were removed at intervals as specified. These were precipitated with water and the cellulose acetate phthalates obtained were washed, dried and analyzed for phthalyl content.

*Effect of time of reaction at various low temperatures on phthalyl content*

| Reaction Time at 100° C., Hrs. | "Low" Reaction Temperature, °C. | Reaction Time at Low Temp., Hours | Percent Phthalyl |
|---|---|---|---|
| 2 | 30 | 0 | 30.8 |
|   |    | 1 | 32.0 |
|   |    | 2 | 32.3 |
|   |    | 5 | 32.4 |
|   |    | 24 | 32.7 |
| 2 | 40 | 0 | 30.7 |
|   |    | 1 | 32.4 |
|   |    | 2 | 32.7 |
|   |    | 5 | 33.0 |
|   |    | 24 | 32.6 |
| 2 | 50 | 0 | 31.8 |
|   |    | 1 | 33.4 |
|   |    | 2 | 33.8 |
|   |    | 5 | 34.2 |
|   |    | 24 | 34.6 |
| 2 | 60 | 0 | 31.4 |
|   |    | 1 | 33.7 |
|   |    | 2 | 33.8 |
|   |    | 5 | 34.1 |
|   |    | 24 | 34.8 |

In those methods in which for instance acetic acid is employed as the solvent a low liquid to solid ratio is usually used. In employing our invention in conjunction therewith ordinarily only reduced temperatures on the order of not less than 50–60° C. are principally effective. On the other hand, when more dilute reaction baths are used, the temperature in the second step may be reduced to a value which does not increase the viscosity to the point of crystallization of the mass, which may be as low as 20° C.

Our invention is useful as well in preparing cellulose ether phthalates such as are obtained by using a partially substituted ethyl cellulose as the starting material in the esterification reaction. Our invention is also useful in preparing other dicarboxylic acid esters such as the maleates or the succinates of cellulose esters and of cellulose ethers as well as the corresponding compounds in which substituted phthalic acid derivatives are prepared, such as are obtained by reacting nitrophthalic anhydride with a cellulose ester or a cellulose ether. The cellulose esters prepared by the procedure described are useful for coatings, film backings, enteric coatings for medicaments and various other purposes in which a product which is insoluble in acid and soluble in alkali is useful.

We claim:

1. A method of preparing cellulose dicarboxylic acid esters in which a cellulose compound selected from the group consisting of the lower fatty acid esters and the ethers of cellulose containing free and esterifiable hydroxyl groups is esterified with a dicarboxylic acid anhydride, in two steps, the first step of which comprises esterifying the cellulose compound within the temperature range of from 80° C. up to the reflux temperature of the mass, whereby the major part of the introduction of dicarboxylic acid radical into the cellulose compound occurs and the second step of which comprises reducing the temperature of the mass to not more than 50–60° C. nor less than 20° C. and further esterifying the cellulose compound with the dicarboxylic acid anhydride.

2. A method of preparing cellulose dicarboxylic acid esters in which a lower fatty acid ester of cellulose containing free and esterifiable hydroxyl groups is esterified with a dicarboxylic acid anhydride in two steps in the first step of which the ester is esterified within the temperature range of from 80° C. up to the reflux temperature of the mass, whereby the major part of the introduction of dicarboxylic acid radical into the cellulose ester occurs and the second step of which comprises reducing the temperature to not more than 50–60° C. nor less than 20° C. and further esterifying the cellulose ester with the dicarboxylic acid anhydride.

3. A method of preparing a dicarboxylic acid ester of a cellulose ether in which a cellulose ether having free and esterifiable hydroxyl groups is esterified with a dicarboxylic acid anhydride in two steps in the first step of which the ether is esterified within the temperature range of from 80° C. up to the reflux temperature of the mass, whereby the major part of the introduction of dicarboxylic acid radical into the cellulose ether occurs and the second step of which comprises reducing the temperature to not more than 50–60° C. nor less than 20° C. and further esterifying the cellulose ester with the dicarboxylic acid anhydride.

4. A method of preparing cellulose phthalic acid esters in which a cellulose compound selected from the group consisting of the lower fatty acid esters and the ethers of cellulose containing free and esterifiable hydroxyl groups is esterified with phthalic anhydride in two steps in the first step of which the cellulosic material is esterified within the temperature range of 80° C. up to the reflux temperature of the mass, whereby the major part of the introduction of phthalic acid radical into the cellulosic material occurs and the second step of which comprises reducing the temperature to not more than 50–60° C. nor less than 20° C. and further esterifying the cellulosic material with the phthalic anhydride.

5. A method of preparing cellulose acetate phthalate in which partially acetylated cellulose is esterified with phthalic anhydride in two steps in the first step of which the acetylated cellulose is phthalated within the temperature range of 80° C. up to the reflux temperature of the mass, whereby the major part of the introduction of phthalic acid radical into the cellulose acetate occurs and the second step of which comprises reducing the temperature to not more than 50–60° C. nor less than 20° C. and further esterifying the cellulose acetate with the phthalic anhydride.

6. A method of preparing cellulose dicarboxylic acid esters in which a cellulose compound selected from the group consisting of the lower fatty acid esters and the ethers of cellulose containing free and esterifiable hydroxyl groups is esterified in a bath comprising a dicarboxylic acid anhydride and pyridine in two steps, in the first step of which the esterification is carried out within the temperature range of 80° C. up to the reflux temperature of the esterification mass, whereby the major part of the introduction of dicarboxylic acid radical into the cellulosic material occurs and the second step of which comprises reducing the temperature to not more than 50–60° C. nor less than 20° C. and further esterifying the cellulosic material with the dicarboxylic acid anhydride.

7. A method of preparing cellulose dicarboxylic acid esters in which a cellulose compound selected from the group consisting of the lower fatty acid esters and the ethers of cellulose containing free and esterifiable hydroxyl groups is esterified in a bath comprising dicarboxylic acid anhydride, acetic acid as the solvent and sodium acetate as the catalyst, in the first step of which the esterification is conducted within the range of 80° C. up to the reflux temperature of the mass whereby the major part of the introduction of dicarboxylic acid radical occurs and in the second step of which the temperature is reduced to not more than 50–60° C. nor less than 20° C. and the cellulosic material is further esterified with the dicarboxylic acid anhydride.

References Cited in the file of this patent

UNITED STATES PATENTS

| | | |
|---|---|---|
| 1,108,329 | Callahan | Aug. 25, 1914 |
| 2,093,462 | Malm et al. | Sept. 21, 1937 |
| 2,126,460 | Genung | Aug. 9, 1938 |
| 2,196,768 | Hiatt | Apr. 9, 1940 |
| 2,759,925 | Hiatt et al. | Aug. 21, 1956 |